J. W. H. Cheney,
Cutting Printers' Leads,
No. 81,476. Patented Aug. 25, 1868.
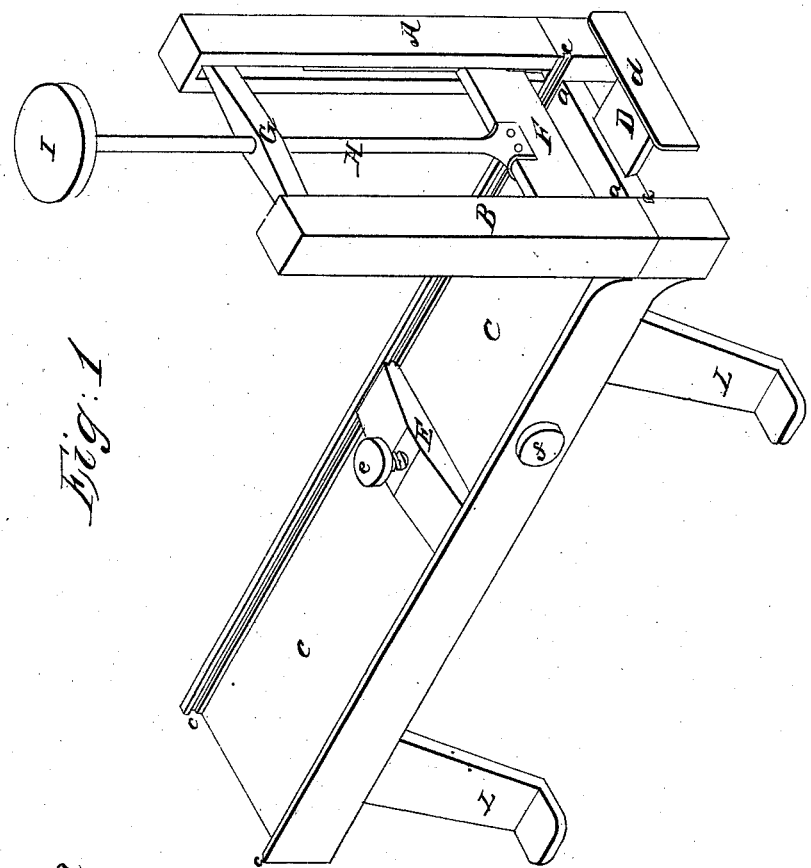
Fig. 1
Fig. 2
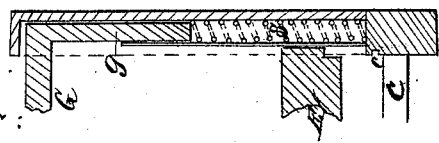
Witnesses:
Theo. G. Ellis
Geo. A. Paine 2d
Inventor:
J. W. H. Cheney

United States Patent Office.

JOHN W. H. CHENEY, OF HARTFORD, CONNECTICUT.

Letters Patent No. 81,476, dated August 25, 1868.

---

IMPROVEMENT IN CUTTING PRINTERS' LEADS.

---

The Schedule referred to in these Letters Patent and making part of the same.

---

TO ALL WHOM IT MAY CONCERN:

Be it known that I, JOHN W. H. CHENEY, of Hartford, in the county of Hartford, and State of Connecticut, have invented a new and useful Machine for Cutting Printers' Leads; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My invention has for its object a more rapid and easy method of cutting printers' leads into uniform lengths, such as are required to be prepared by the printer when setting up type for ordinary job-work.

The usual manner of cutting such leads is to have a cutter arranged like an ordinary shears, with a bed-plate and gauge upon one side, so that the piece cut off to a given length remains upon the plate, and the rest falls down upon the table on which the machine stands.

My invention consists in constructing a machine, as hereinafter described, so as to obviate the defects of those now in use, and cut the leads in a more expeditious manner.

Figure 1 is a perspective view of my machine for cutting leads.

Figure 2 is a vertical section through the middle of the post A, to show the interior arrangement of the parts.

A and B are upright posts, firmly attached to the bed-plate C.

D is a sliding gauge, of the same length as the bed-plate, held in a dove-tailed groove in the under side of the plate C. $f$ is a set-screw or clamp, passing through the side of the bed-plate, and acting against the edge of the gauge D, to fasten it in any desired position.

E is a gauge upon the top of the bed-plate, sliding in grooves $c$ $c$ in the raised edges of the plate, and furnished with the set-screw $e$, for fastening it in any required position.

F is the cutter, moving up and down in guides in the posts A and B, in such a manner that its lower cutting-edge just shaves against the edge $a$ $a$ of the bed-plate C, and forms a vertically-acting shears. The cutter F is connected with the rod H and handle I. Attached to the rod H is a cross-head, G, which, like the cutter F, moves in slides in the posts A and B. The two being connected together by the rod H, causes the cutter to move up and down truly and firmly, parallel to the edge $a$ $a$ of the bed-plate, and square with its raised edges along $c$ $c$.

The cross-head G, by means of the arms $g$, rests upon coiled springs, S, in each of the two posts, which springs act upward, and keep the cutter raised in the position shown in the drawing.

L L are the legs of the machine, by which it is attached to a table or suitable stand.

The several parts of the machine can be made of iron, brass, or other suitable metal, having the cutter F and the edge $a$ $a$ of steel or other sufficiently hard metal.

The operation of my invention is as follows:

When it is desired to cut a number of leads of a certain length, the end, $d$, of the gauge D, is set at the proper distance out from the edge $a$ $a$, and the strip of lead placed upon the bed-plate C of the machine, against one of the edges, as at $c$ $c$, and pushed out till its end comes against the end, $d$, of the gauge. A blow is then struck with the hand upon the handle I, which drives down the cutter F and cuts off the lead, the piece cut off falling down out of the way, and the cutter springing up, when the original piece is pushed forward another length, and cut off as before.

The gauge D can be set at once to the right distance by inserting a lead of the proper length between the part $d$ and the end of the plate C, moving $d$ up to it, and clamping in that position.

When it is more convenient to measure the length back from the cutter, the gauge E is used, by clamping it in the desired position, and pressing the end of the lead against it when cut.

The advantages of my invention over others are—

First, that the cutter is always raised out of the way when putting in a lead, and in position for action.

Second, it cuts leads more rapidly and easily than by the usual methods.

Third, either the forward or back gauge can be set at once to any given length, an arrangement which no other machine now in use possesses.

Fourth, the smallest pieces of metal cut are free from burr or twist, and ready to be used in the finest work.

Fifth, its simplicity of construction, durability, and economy.

*Claim.*

What I claim as my invention, and desire to secure by Letters Patent, is—

The arrangement of the hand-cutter F, and the parts by which it is operated, with the stationary cutter $a$, bed C, and adjustable gauges D and E, when constructed as described and for the purpose specified.

J. W. H. CHENEY.

Witnesses:
   THEO. G. ELLIS,
   GEO. A. PAINE, 2d.